United States Patent
Ite et al.

(10) Patent No.: US 9,778,127 B2
(45) Date of Patent: Oct. 3, 2017

(54) PHYSICAL QUANTITY MEASURING DEVICE

(71) Applicant: NAGANO KEIKI CO., LTD., Tokyo (JP)

(72) Inventors: Takayuki Ite, Tokyo (JP); Daiki Aruga, Tokyo (JP); Hideki Muramatsu, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 142 days.

(21) Appl. No.: 14/973,967

(22) Filed: Dec. 18, 2015

(65) Prior Publication Data
US 2016/0187218 A1 Jun. 30, 2016

(30) Foreign Application Priority Data
Dec. 24, 2014 (JP) ................. 2014-260546

(51) Int. Cl.
| | |
|---|---|
| G01L 19/00 | (2006.01) |
| G01L 7/00 | (2006.01) |
| G01L 13/02 | (2006.01) |
| G01L 19/06 | (2006.01) |
| G01L 19/14 | (2006.01) |

(52) U.S. Cl.
CPC ........ G01L 13/025 (2013.01); G01L 19/0038 (2013.01); G01L 19/06 (2013.01); G01L 19/0627 (2013.01); G01L 19/143 (2013.01)

(58) Field of Classification Search
None
See application file for complete search history.

(56) References Cited

U.S. PATENT DOCUMENTS 5,932,808 A * 8/1999 Hayashi ................ G01L 9/0075
  73/718
9,631,991 B2 * 4/2017 Tohyama .............. G01L 9/0051
(Continued)

FOREIGN PATENT DOCUMENTS

| JP | H02-18767 U | 2/1990 |
| JP | H02-501595 A | 5/1990 |

(Continued)

OTHER PUBLICATIONS

Japanese Office Action with English Translation dated Jun. 20, 2017, 8 pages.

*Primary Examiner* — Andre Allen
(74) *Attorney, Agent, or Firm* — Rankin, Hill & Clark LLP (57) ABSTRACT

A differential pressure sensor includes: a sensor module including: a sensor case including a port through which a target fluid is to be introduced and a base attached with the port; a sensor configured to detect a physical quantity of the target fluid; a sensor substrate attached with the sensor, the sensor substrate having an outer circumferential surface facing an inner circumferential surface of the base; and a cover configured to press the sensor substrate against the base; and a case body including an electric circuit that is housed therein and electrically connectable to the sensor module, the case body having an open end to which the sensor module is externally attached, in which a sensor module clearance is defined between the outer circumferential surface of the sensor substrate and an inner circumferential surface of the sensor case.

8 Claims, 10 Drawing Sheets

(56) References Cited

U.S. PATENT DOCUMENTS

| | | | | |
|---|---|---|---|---|
| 2002/0100331 A1* | 8/2002 | Imai | .................... | G01L 19/0069 |
| | | | | 73/753 |
| 2008/0257052 A1 | 10/2008 | Kuznia et al. | | |
| 2014/0033824 A1* | 2/2014 | Habibi | .................. | G01L 9/0073 |
| | | | | 73/724 |
| 2014/0291677 A1* | 10/2014 | Le Neel | .............. | H01L 25/0652 |
| | | | | 257/48 |
| 2015/0369682 A1* | 12/2015 | Nakajima | ................ | G01L 9/065 |
| | | | | 73/384 |
| 2016/0091384 A1* | 3/2016 | Muller | .................. | G01L 19/141 |
| | | | | 73/715 |
| 2016/0202136 A1* | 7/2016 | Miyashita | ............. | G01L 9/0058 |
| | | | | 73/726 |
| 2016/0334291 A1* | 11/2016 | Lux | ....................... | G01L 19/141 |

FOREIGN PATENT DOCUMENTS

| | | |
|---|---|---|
| JP | H08-82563 A | 3/1996 |
| JP | 2002-107246 A | 4/2002 |
| JP | 2013-033038 | 2/2013 |
| JP | 2014-132218 A | 7/2014 |

\* cited by examiner

PHYSICAL QUANTITY MEASURING DEVICE

The entire disclosure of Japanese Patent Application No. 2014-260546 filed Dec. 24, 2014 is expressly incorporated by reference herein.

TECHNICAL FIELD

The present invention relates to a physical quantity measuring device configured to output a signal corresponding to a physical quantity of a target object.

BACKGROUND ART

Typical examples of physical quantity measuring devices include differential pressure gauges and pressure gauges where a pressure of a target object introduced through a port is detected by a sensor, an output signal from the sensor is received by an electric circuit, and a signal is sent from the electric circuit to a display to be displayed or sent to an external output unit to be externally outputted.

A typical differential pressure gauge includes an electronic component module assembly and a housing assembly for housing the electronic component module assembly (Patent Literature 1: JP-A-2013-33038). The electronic component module assembly of the typical device of Patent Literature 1 includes a sensor carrier element, an electronic component module carrier element where the electronic component is mounted, and a main carrier element that supports the sensor carrier element and the electronic component module carrier element.

Differential pressure gauges require replacement of a sensor and other component(s) to measure different pressure ranges. The typical differential pressure gauge disclosed in Patent Literature 1, in which the electronic component module assembly including the sensor carrier element is housed in the housing assembly, is not configured for the use of sensors different in measurement range. In order to produce the typical differential pressure gauge of Patent Literature 1 using sensors of different measurement ranges, the number of elements that need to be replaced along with the sensors would preferably be reduced as much as possible (i.e., the number of the components usable in common is preferably increased) to reduce the production cost.

A typical integral-type differential pressure gauge needs to be downsized so that it can be integrated. Further, the differential pressure gauge needs to be replaced as a whole when a different pressure range is to be measured because a pressure sensor is housed in a case body.

SUMMARY OF THE INVENTION

An object of the invention is to provide a physical quantity measuring device with a high measurement accuracy that is manufacturable at a reduced cost.

According to an aspect of the invention, a physical quantity measuring device includes: a sensor module including: a sensor case including a port through which a target fluid is to be introduced and a base attached with the port; a sensor configured to detect a physical quantity of the target fluid introduced through the port; a sensor substrate attached with the sensor, the sensor substrate having an outer circumferential surface facing an inner circumferential surface of the base; and a cover configured to press the sensor substrate against the base; and a case body including an electric circuit that is housed therein and electrically connectable to the sensor module, the case body having an open end to which the sensor module is externally attached, in which a sensor module clearance is defined between the outer circumferential surface of the sensor substrate and an inner circumferential surface of the sensor case to prevent transfer of a force from the sensor case to the sensor substrate.

In the above aspect, the sensor suitable for an expected measurement range is attached to the sensor substrate. The sensor substrate is then attached to the base of the sensor case and pressed by the cover. The sensor module is thus manufactured. The sensor module is then attached to the open end of the case body in which the electric circuit is housed. The components other than the sensor module can thus be used in common even when the sensor module is replaced in accordance with the measurement range. Even after the case body is fabricated, the sensor module can be externally attached to the open end of the case body. Thus, the number of components can be reduced, and the physical quantity measuring device can be efficiently manufactured. Further, the physical quantity measuring device can be downsized, reducing the production cost.

In order to install the manufactured physical quantity measuring device in an installations space, the port is connected to a pipe or the like. Since the base of the downsized physical quantity measuring device is thinned, a force is easily transferred to the base through the port.

In the above aspect, the sensor module clearance is defined between the outer circumferential surfaces of the sensor substrate and the cover, and the inner circumferential surface of the base, thereby preventing the transfer of a force from the sensor case to the sensor substrate even in the downsized physical quantity measuring device. The measurement accuracy can thus be increased.

In the above aspect, it is preferable that the sensor substrate is provided with a connection pin electrically connectable to the electric circuit, the electric circuit includes a terminal connectable to the connection pin, and the connection pin extends in a direction where the sensor case is attached to the open end of the case body.

In the above aspect, the connection pin is connected to the terminal when the sensor case attached with the sensor module and the cover is attached to the case body. An assembly process of the physical quantity measuring device can thus be simplified.

In the above aspect, it is preferable that the case body further includes a guide member configured to guide the connection pin to the terminal.

In attaching the sensor case to the case body, the connection pin is guided to be connected to the terminal by the guide member. An assembly process of the physical quantity measuring device can thus be further simplified. Further, even when the sensor case is displaced, the connection pin, which is guided by the guide member, is prevented from being detached from the terminal.

In the above aspect, it is preferable that the sensor substrate is provided with a signal converter configured to receive an output signal from the sensor and convert/adjust the output signal.

An electronic component for signal conversion provided to the sensor substrate can process an output signal from the sensor such that the output signal is converted/adjusted to a predetermined value. Thus, in attaching the sensor module, an instrument error can be easily corrected by the electric circuit.

In the above aspect, it is preferable that the sensor module includes sensor modules with all possible measurement ranges, and the signal converter is configured to convert/adjust the output signal from the sensor to a value at which respective outputs from the sensor modules with all possible measurement ranges are to be equalized.

In the above aspect, the signal converter equalizes the outputs from the sensor modules. In attaching the sensor module, an instrument error can thus be easily corrected by the electric circuit.

In the above aspect, it is preferable that the sensor substrate is provided with a storing circuit configured to store information of the sensor, and the electric circuit is configured to share the information with the storing circuit.

In the above aspect, the storing circuit provided to the sensor substrate can store a pressure range and a signal outputted in response to application of pressure as information of the sensor. This information stored in the storing circuit or in the sensor module can be shared with the electric circuit. It is thus unnecessary for the electric circuit to correct instrument errors between the sensor modules.

In the above aspect, it is preferable that the signal converter and the storing circuit are integral with each other.

In the above aspect, since the signal converter and the storing circuit are integral with each other, the number of components can be reduced, and the physical quantity measuring device can be downsized.

In the above aspect, it is preferable that the base includes a plate facing the sensor substrate and a wall disposed around an outer periphery of the plate, a projection is provided to one of the wall and the open end, and a recess engageable with the projection is provided to the other one of the wall and the open end.

In the above aspect, the projection of one of the wall and the open end is engaged with the recess of the other one thereof. The base of the sensor module can thus be easily attached to the case body.

DESCRIPTION OF EMBODIMENT(S)

First Exemplary Embodiment

A first exemplary embodiment of the invention will be described with reference to FIGS. 1 to 6. "Upper and lower" hereinbelow mean upper and lower sides defined in FIGS. 1 to 4 and 6.

Figure 1:
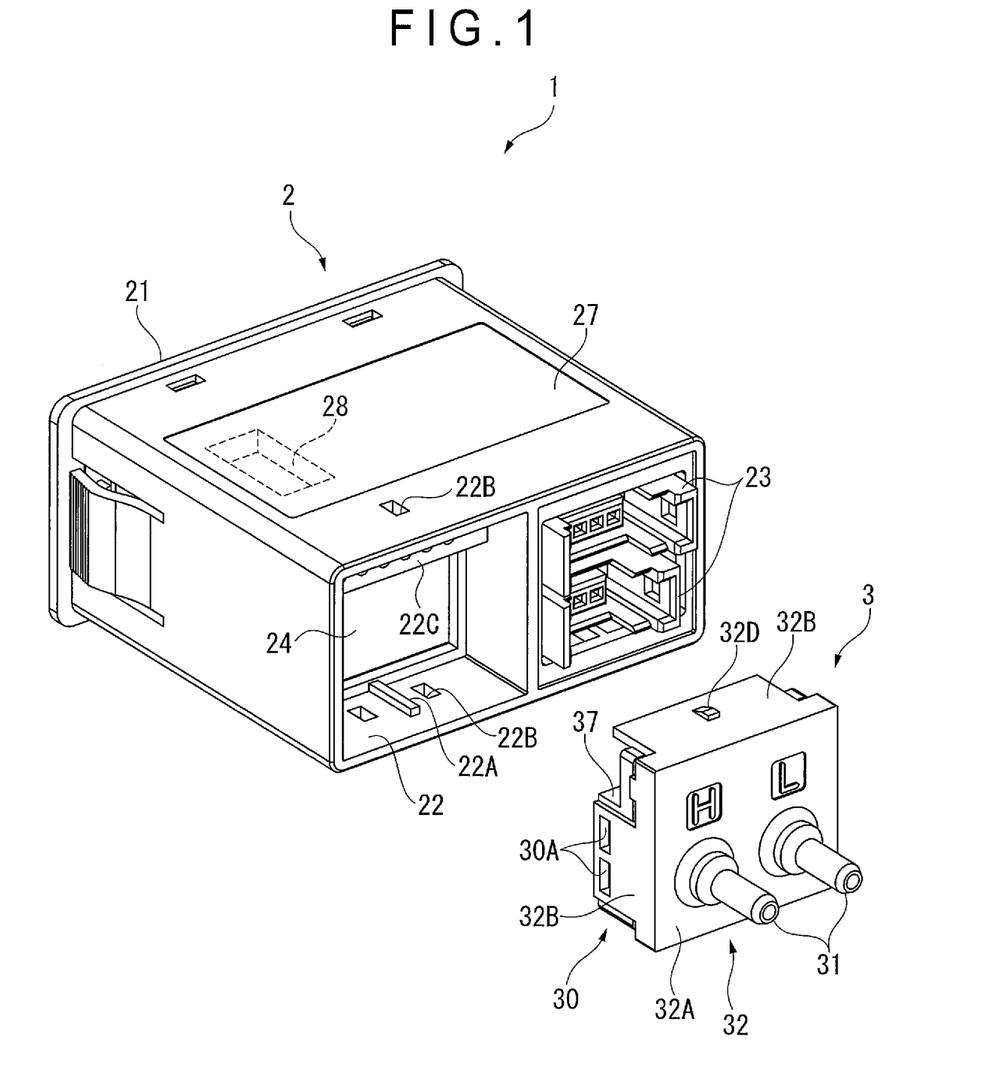
FIG. 1 is a perspective view of a differential pressure sensor according to a first exemplary embodiment of the invention, where a sensor module is before being attached to a case body.
Figure 2:
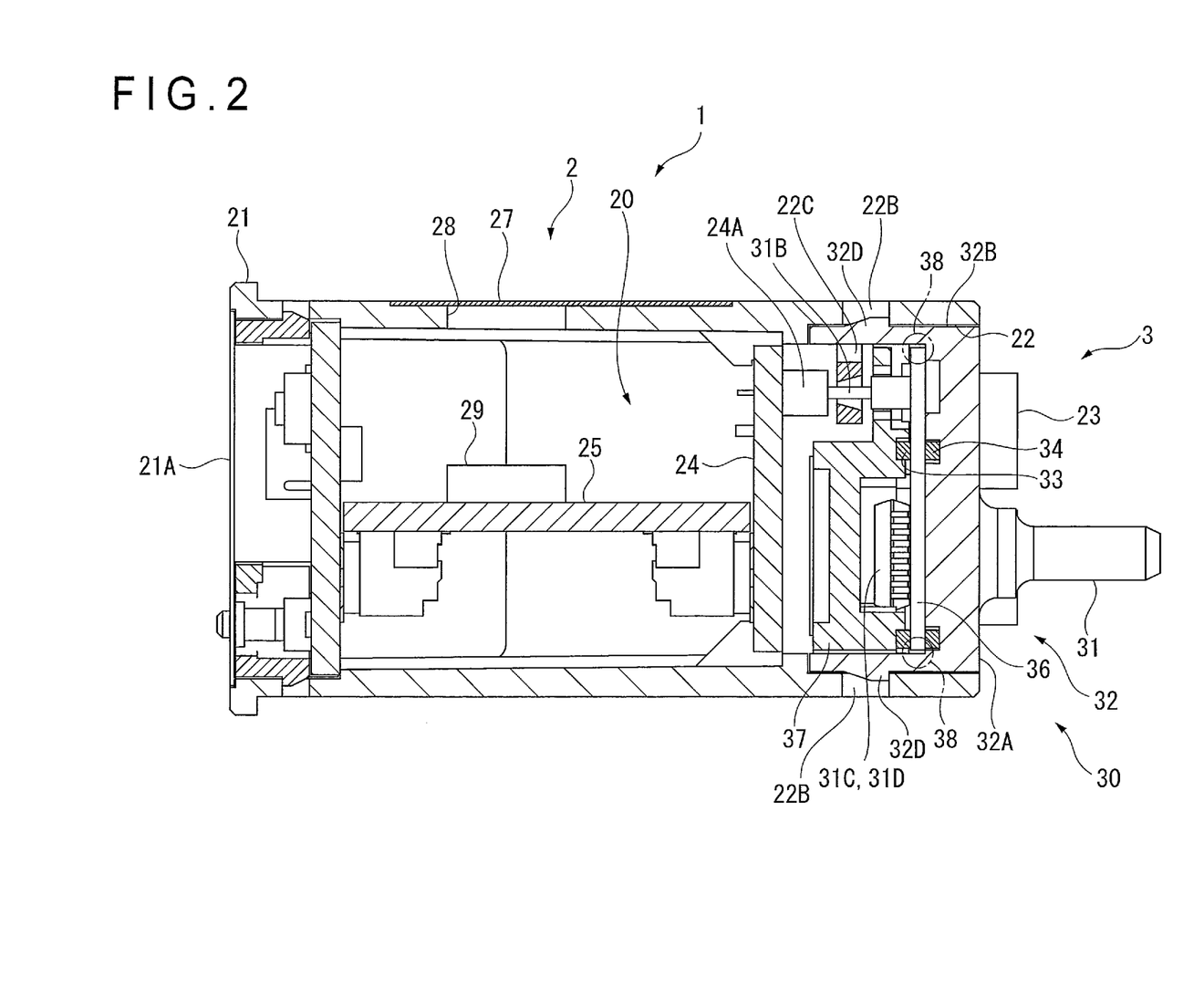
FIG. 2 is a sectional side view of the differential pressure sensor according to the first exemplary embodiment with the sensor module being attached to the case body.
Figure 3:
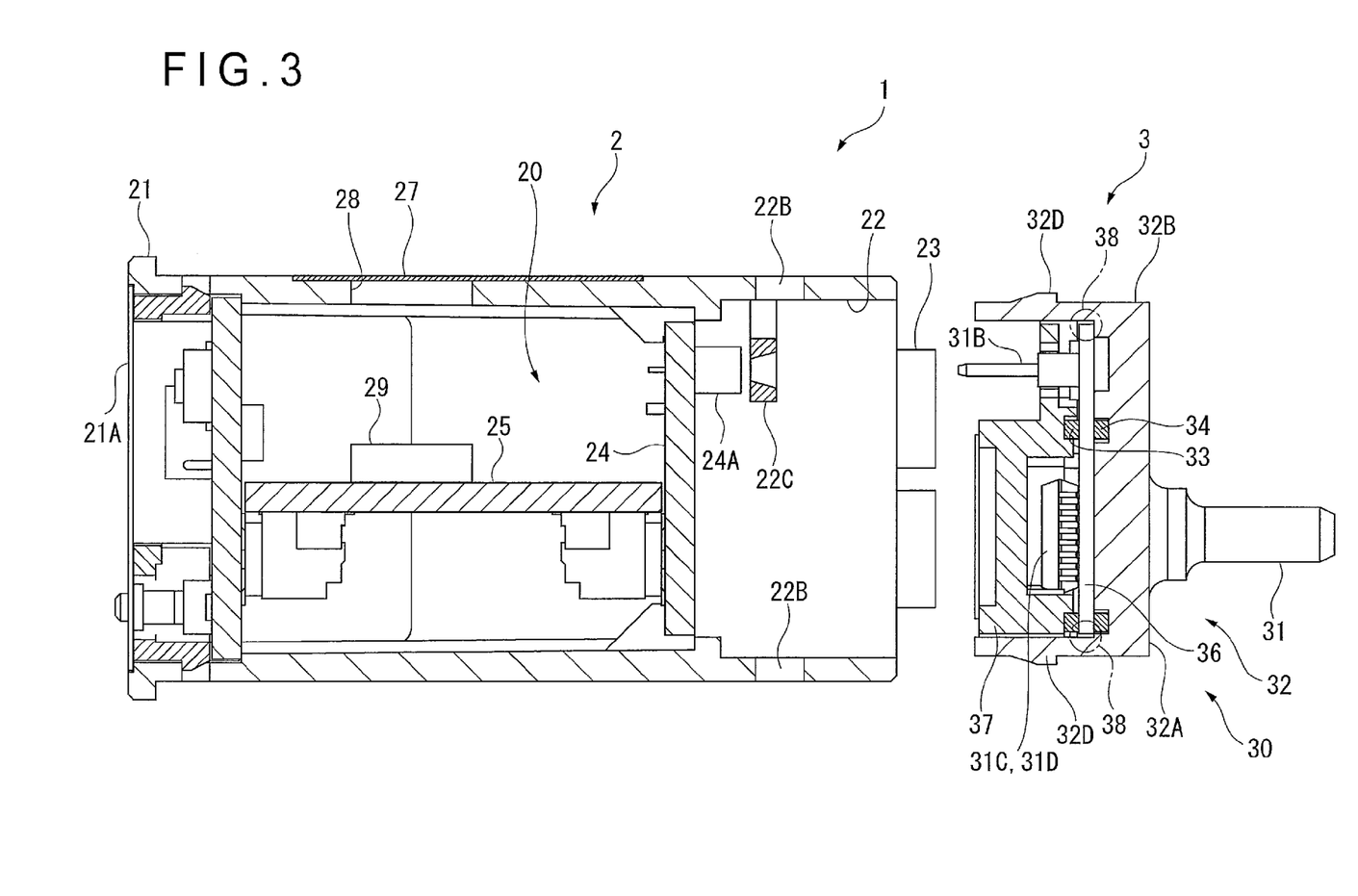
FIG. 3 is a sectional side view of the differential pressure sensor according to the first exemplary embodiment, where the sensor module is before being attached to the case body.

A physical quantity measuring device of the first exemplary embodiment is exemplified by a differential pressure sensor 1, more specifically a compact digital differential pressure gauge. FIG. 1 is a perspective view showing the differential pressure sensor 1 from the rear side thereof. FIG. 2 is a sectional view showing the differential pressure sensor 1. As shown in FIGS. 1 and 2, the differential pressure sensor 1 includes a case body 2 and a sensor module 3. The case body 2 and the sensor module 3 are independent of each other. As shown in FIGS. 1 and 3, the sensor module 3 is externally attached to the case body 2 in use. Even when attached to the case body 2, the sensor module 3 is not enclosed in the case body 2, but a rear end thereof is exposed.

As shown in FIG. 1, the case body 2, which is in a box-shape, includes a front case 21 disposed at a front side of the case body 2 and attached with a panel sheet 21A, a rectangular open end 22 defined at a rear side of the case body 2, and an external terminal 23 disposed at the rear side of the case body 2. The external terminal 23 includes an external output terminal and a power terminal. An electric circuit 20 is disposed in the case body 2. The electric circuit 20 includes a terminal board 24 and a central processing unit (CPU) board 25.

The terminal board 24, which includes a sensor signal input circuit, an external output circuit and a power circuit, is electrically connected to the external terminal 23, a display, an operation switch and the CPU board 25.

The CPU board 25 includes an adjustment unit 29. The adjustment unit 29 is configured to adjust the intensity of an external output from the differential pressure sensor 1. The intensity of the external output is adjusted by operating the adjustment unit 29 with, for instance, tweezers inserted through an adjustment window 28 penetrating an upper surface of the case body 2.

Upper and lower inner walls of the open end 22 are provided with a guide 22A and a recess 22B for attaching the sensor module 3 and a guide member 22C for guiding a connection pin 31B (described later) to an internal terminal 24A (a terminal) provided to the terminal board 24. The guide member 22C not only guides the connection pin 31B, but also prevents the connection pin 31B from being detached from the internal terminal 24A.

Figure 5:
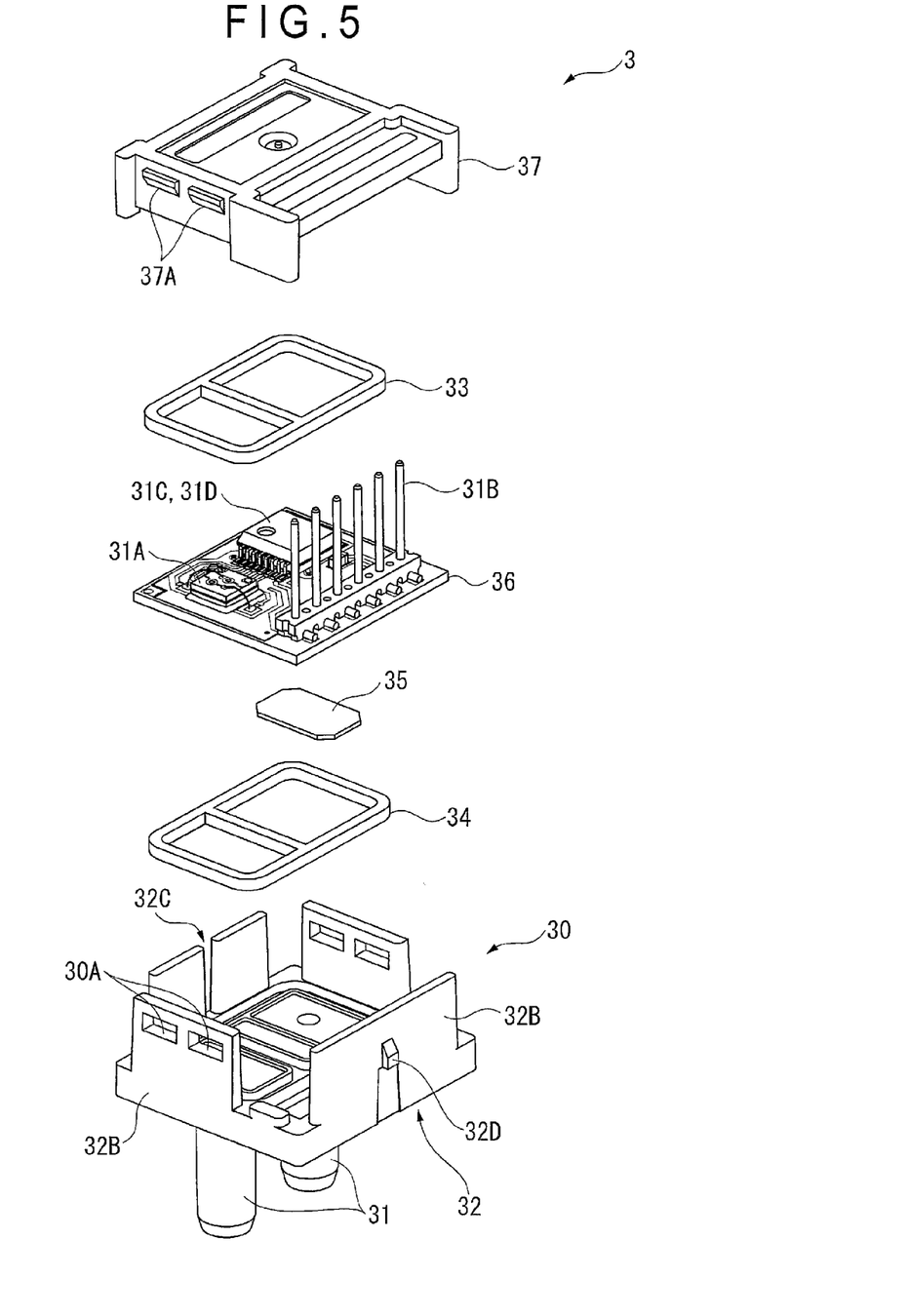
FIG. 5 is an exploded perspective view of the sensor module.
Figure 6:
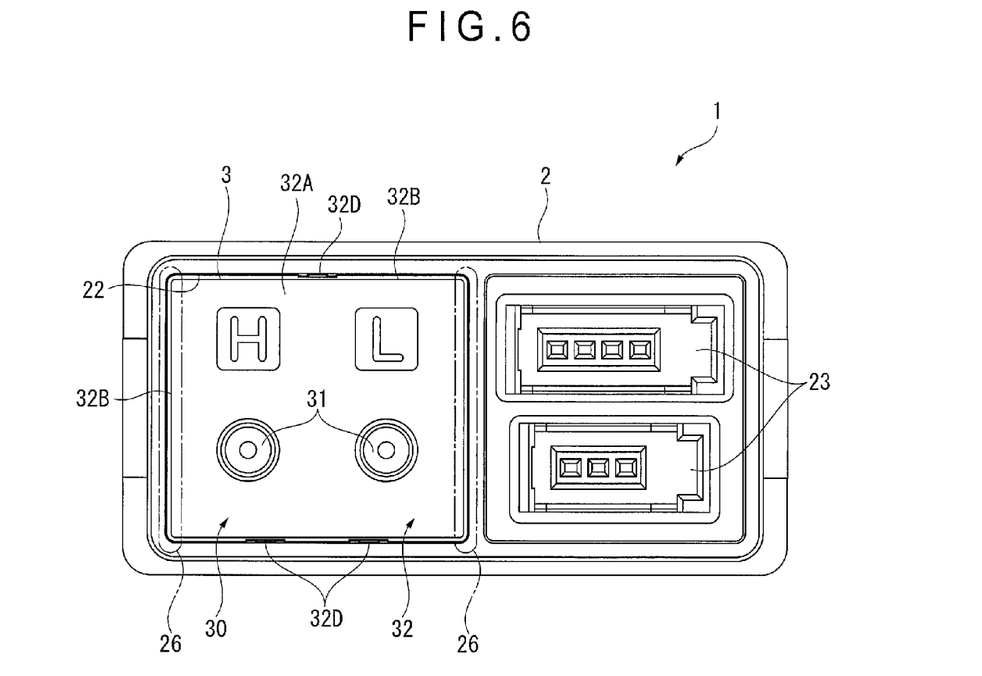
FIG. 6 is a rear view of the differential pressure sensor according to the first exemplary embodiment.

The sensor module 3 includes a cylindrical port(s) 31 where a target fluid is introduced, a base 32 attached with the port 31, upper and lower gaskets 33, 34 each formed by an elastic member, and a filter 35 for filtering a foreign substance contained in the target fluid (see FIG. 5). A combination of the port 31 and the base 32 is hereinafter referred to as a sensor case 30.

The base 32, which is in a box-shape, includes a plate 32A attached with the port 31 and four (upper, lower, right and left) walls 32B surrounding the plate 32A. The upper and lower walls 32B are provided with a projection 32D engageable with the recess 22B and a groove 32C (see FIG. 5) that is to be guided by the guide 22A of the open end 22 of the case body 2. It should be noted that the inner walls of the open end 22 may be provided with a groove and a projection, while the walls 32B of the base 32 may be provided with a guide and a recess.

Such an engagement arrangement allows the upper and lower inner walls of the open end 22 to be partially in contact with the upper and lower walls 32B of the sensor module 3 when the sensor module 3 is attached to the case body 2. Simultaneously, a vertically continuous clearance 26 is defined between the right inner wall of the open end 22 and the right wall 32B of the sensor module 3 and between the left inner wall of the open end 22 and the left wall 32B of the sensor module 3 (see FIG. 6).

A dimension of the clearance 26 is determined such that the sensor module 3 can be fixed without any influence of the clearance 26. The clearance 26 accepts a deformation of the base 32 due to a force applied to the port 31, reducing a load on the base 32. Further, the clearance 26 allows correction of a positional displacement between the internal terminal 24A and the connection pin 31B.

The sensor module 3 also includes a sensor substrate 36 that is substantially parallel with the plate 32A and has an outer circumferential surface facing the walls 32B, and a cover 37. The cover 37 includes an engagement projection 37A engageable with an engagement hole 30A provided to the walls 32B of the sensor case 30. In an engagement state, the cover 37 presses the sensor substrate 36, which is held between the upper gasket 33 and the lower gasket 34 or the filter 35, against the base 32 to fix the sensor substrate 36.

Figure 4:
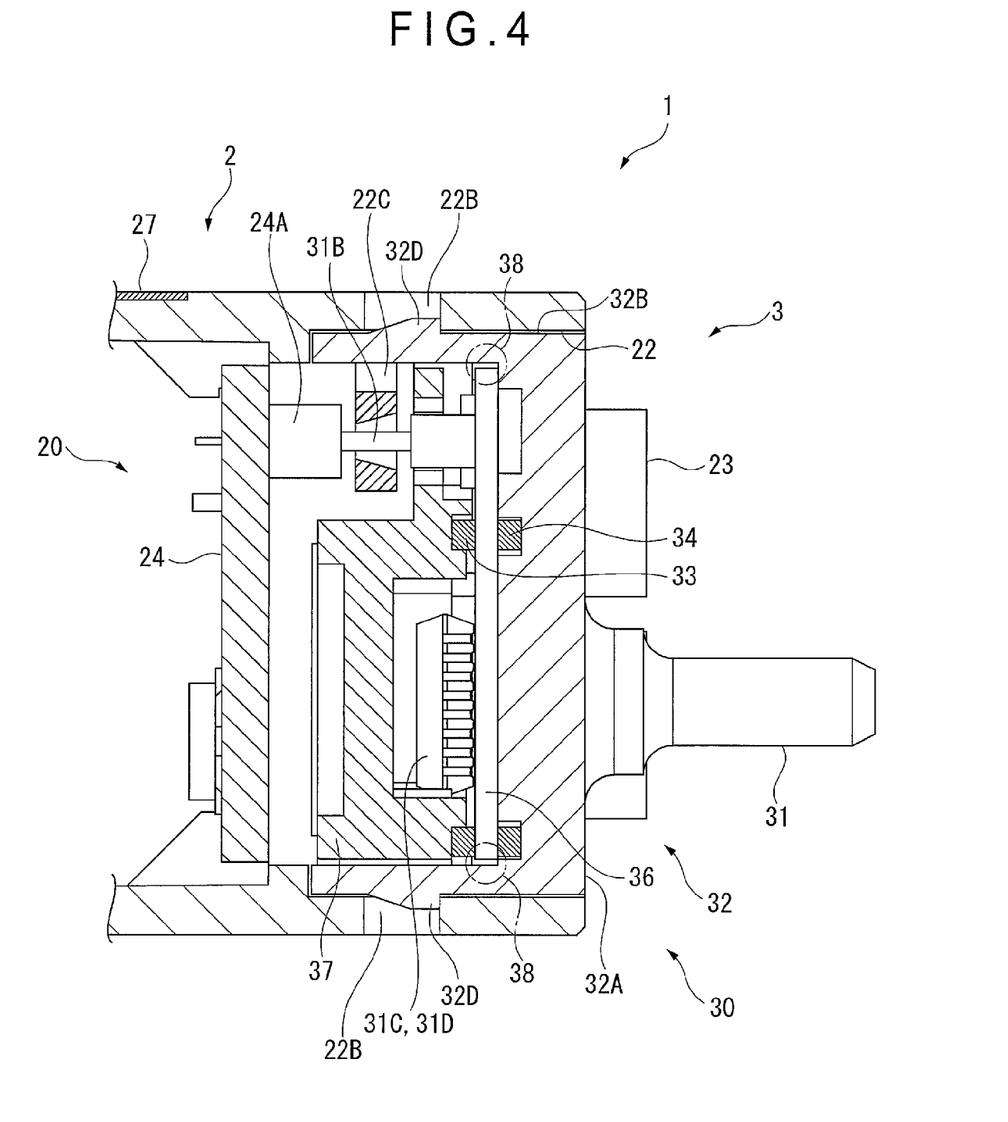
FIG. 4 is a sectional side view showing a relevant part of the differential pressure sensor according to the first exemplary embodiment on an enlarged scale.

As shown by chain lines in a circle in FIGS. 2 to 4, a sensor module clearance 38 is defined between the fixed sensor substrate 36 and the walls 32B. The sensor module clearance 38 surrounds the sensor substrate 36.

As shown in FIG. 5, the sensor substrate 36 includes a sensor 31A configured to detect a pressure (physical quantity) of a target fluid introduced through the port 31, the connection pin 31B electrically connectable to the electric circuit 20, and an integrated circuit (IC). The IC functions as a signal converter 31C and a storing circuit 31D. The signal converter 31C is configured to convert/adjust an output received from the sensor 31A to a signal with an intensity corresponding to the output. The storing circuit 31D is configured to store information of the sensor 31A (e.g., a pressure range and a signal outputted in response to application of a pressure). In other words, the signal converter 31C and the storing circuit 31D are integral with each other.

The connection pin 31B is in the form of an elastic long stick extending in a direction where the sensor module 3 is connected to the case body 2, and has an end insertable to the internal terminal 24A of the electric circuit 20. The information stored in the storing circuit 31D of the sensor module 3 is shared with the electric circuit 20 in the case body 2 through the connection pin 31B.

Method of Manufacturing Differential Pressure Sensor

A method of manufacturing the differential pressure sensor 1 will be described mainly with reference to FIGS. 3 and 5.

First, the connection pin 31B and the IC, which functions as the signal converter 31C and the storing circuit 31D, are mounted on the sensor substrate 36, and then the sensor 31A with a measurement range to be measured is mounted on the sensor substrate 36 by wire bonding.

The sensor substrate 36 is then held between the upper gasket 33 and the lower gasket 34. These components are pressed against the base 32 along with the filter 35 by the cover 37 to be fixed. The manufacturing of the sensor module 3 is thus completed.

Next, pressure is applied to the sensor modules 3. The signal converter 31C converts/adjusts a signal outputted from the sensor 31A to a predetermined value (for instance, a value at which respective outputs from the sensor modules 3 with different measurement ranges, i.e., all the possible measurement ranges, are to be substantially equalized), and measures the converted/adjusted value. For instance, a measurement range of the sensor 31A ranging from 0 to 50 Pa in capacitance output is converted/adjusted to 300 to 3700 pulses in digital output, and a measurement range ranging from −100 to 100 Pa in capacitance output is converted/adjusted to 300 to 3700 pulses in digital output. A pressure range and a signal outputted in response to the application of pressure are stored in the storing circuit 31D as information of the sensor 31A of each of the sensor modules 3. The initialization of the sensor modules 3 is thus completed.

Next, the electric circuit 20 and other components are housed in the case body 2, and the front case 21 with the panel sheet 21A put thereon is attached on the front side of the case body 2. The manufacturing of the case body 2 is thus completed.

Finally, the sensor module 3 is externally attached to the open end 22 of the case body 2, and a product plate 27 is attached on the case body 2. The manufacturing of the differential pressure sensor 1 is thus completed. The attached product plate 27 closes the adjustment window 28 of the case body 2.

Effects of First Exemplary Embodiment

The differential pressure sensor 1 according to the first exemplary embodiment provides the following effects (1) to (8).

(1) Although the sensor module 3 including the sensor 31A needs to be replaced in accordance with the measurement range of the target fluid, the other components of the differential pressure sensor 1 are usable in common. The number of components and goods in process can thus be reduced. Further, the differential pressure sensor 1 can be efficiently manufactured with a reduced production cost.

(2) The sensor module 3 is externally attached to the open end 22 of the case body 2. The sensor module 3 is electrically connected to the case body 2 through the connection pin 31B, and is structurally connected to the case body 2 by engaging the projection and recess of the walls 32B and the open end 22 with each other. The case body 2 and the sensor module 3 can thus be easily connected to each other, reducing the production cost.

(3) The connection pin 31B extends long from the sensor module 3 toward the open end 22 of the case body 2 along an attachment direction. Such a long thin connection pin 31B exhibits elasticity, and thus absorbs a force applied when the sensor module 3 is attached and/or a force resulting from a positional displacement between the connection pin 31B and the internal terminal 24A, preventing these forces from being transferred to the sensor substrate 36. Further, the measurement accuracy of the differential pressure sensor 1 can be improved, and the connection pin 31B and the internal terminal 24A can be prevented from being damaged.

(4) The connection pin 31B is guided by the guide member 22C. The connection pin 31B can be held by the guide member 22C not to be detached from the internal terminal 24A even when a the sensor module 3 is displaced relative to the case body 2. The electrical connection can thus be maintained.

(5) The clearance between the open end 22 and the sensor module 3 and the sensor module clearance 38 between the sensor substrate 36 and the walls 32B can prevent the transfer of a force applicable to the base 32 through the port 31 when the port 31 is connected to a pipe or the like and a force applicable when the sensor module 3 is attached to the open end 22 of the case body 2. The differential pressure sensor 1 can thus perform measurement in a normal state with an improved measurement accuracy.

(6) The signal converter 31C can convert/adjust the outputs from the sensor modules 3 with different measurement ranges, i.e., all the measurement ranges, to substantially the same value. In attaching the sensor module 3, an instrument error can thus be easily corrected by the electric circuit 20.

(7) The storing circuit 31D stores the information of the sensor 31A, which is shared with the electric circuit 20. In attaching the sensor module 3, it is thus not necessary for the electric circuit 20 to correct an instrument error.

(8) Since the differential pressure sensor 1 employs the semiconductor element (IC) functioning as the signal converter 31C and the storing circuit 31D, the number of components can be reduced, and the differential pressure sensor 1 can be downsized.

Second Exemplary Embodiment

Figure 7:
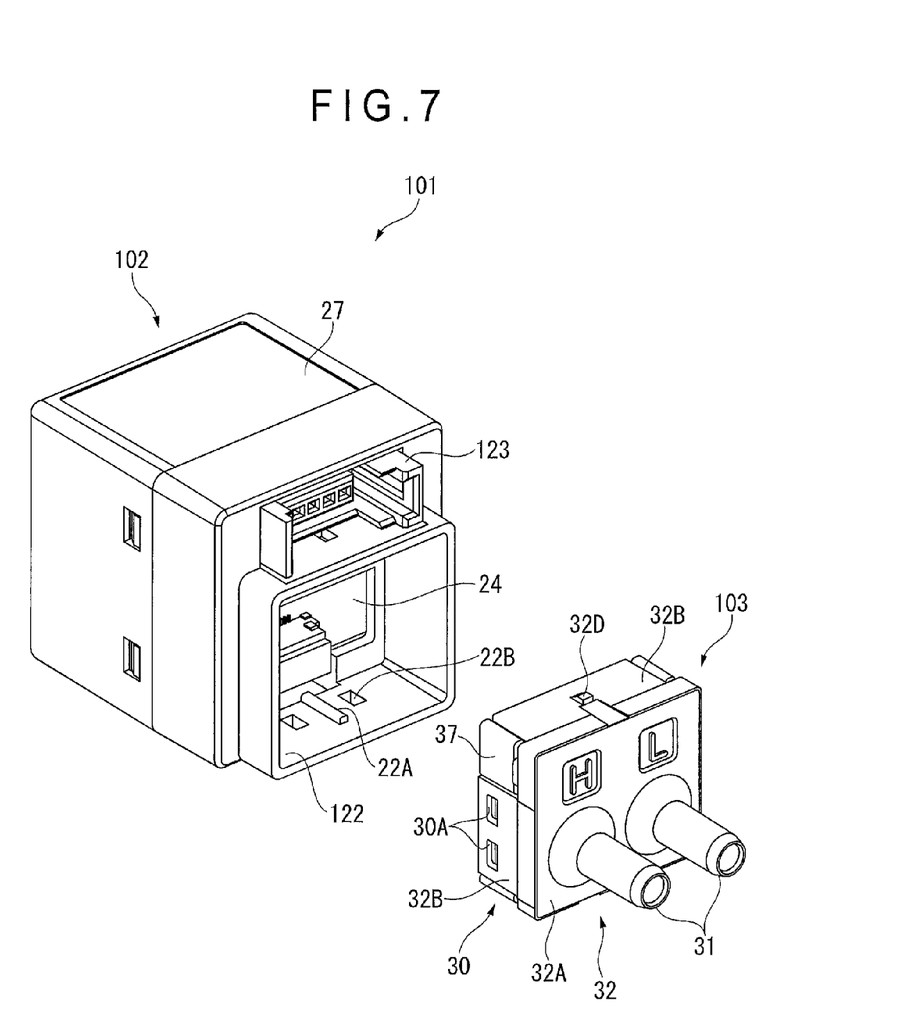
FIG. 7 is a perspective view of a differential pressure sensor according to a second exemplary embodiment of the invention, where a sensor module is before being attached to a case body.
Figure 8:
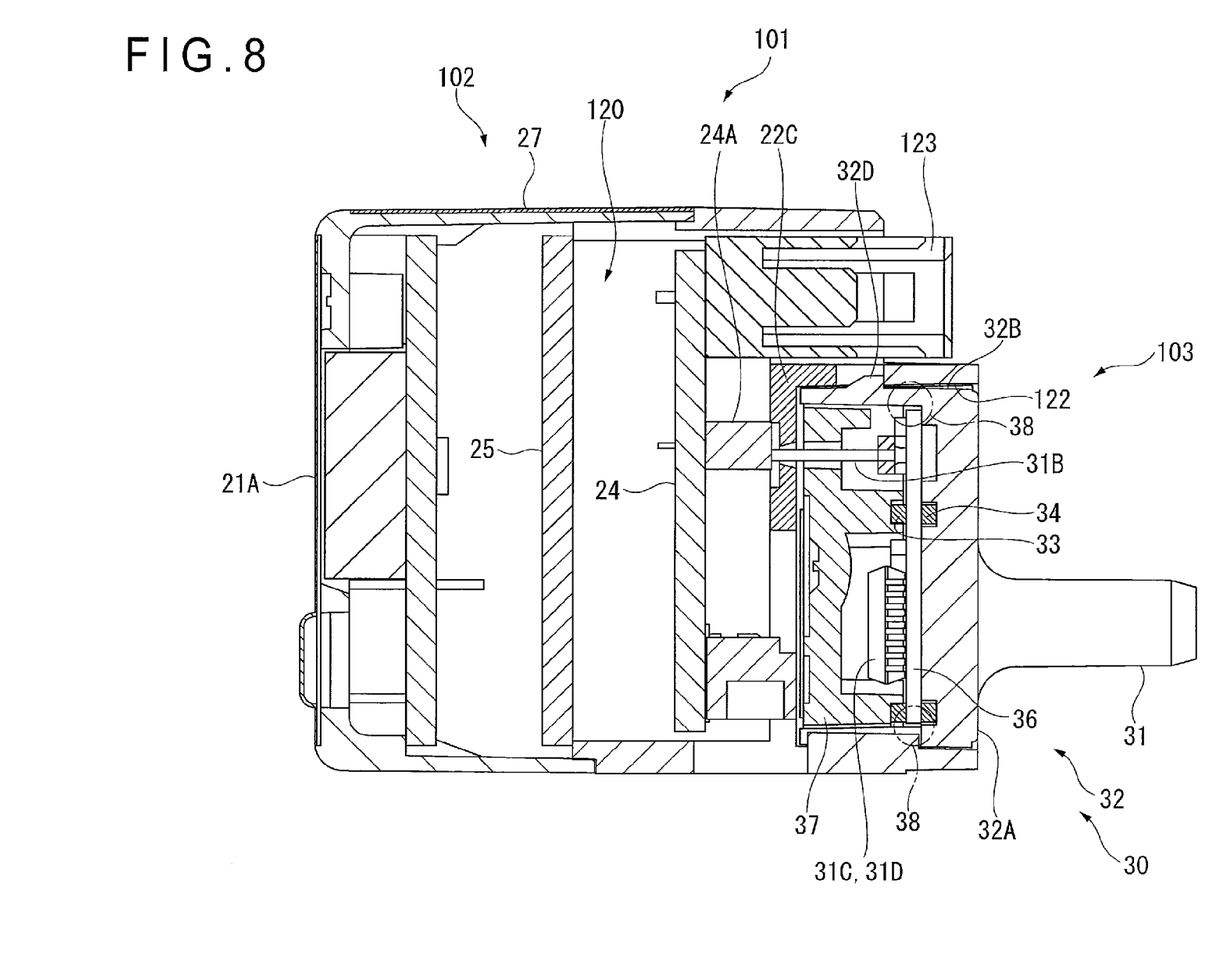
FIG. 8 is a sectional side view of the differential pressure sensor according to the second exemplary embodiment with the sensor module being attached to the case body.

A differential pressure sensor 101 according to a second exemplary embodiment will be described with reference to FIGS. 7 and 8. The differential pressure sensor 101 according to the second exemplary embodiment is different from the differential pressure sensor 1 according to the first exemplary embodiment in the configuration of a case body 102.

It should be noted that a sensor module 103 according to the second exemplary embodiment and the sensor module 3 according to the first exemplary embodiment are structurally substantially the same except some minor differences in detail, and thus are compatible. Accordingly, like reference characters are used to designate like elements, and the explanation thereof will be omitted. The same applies to a sensor module 203 according to a third exemplary embodiment.

The case body 2 according to the first exemplary embodiment includes the external terminal 23, which is in the form of a pair of terminals, disposed at the right side of the open end 22 in a rear view of the differential pressure sensor 1. In contrast, the case body 102 according to the second exemplary embodiment includes a single external terminal 123 disposed above an open end 122. The external terminal 123 functions as not only an external output terminal but also a power terminal.

The open end 122 is structurally substantially the same as the open end 22 according to the first exemplary embodiment. Similarly, an electric circuit 120 is structurally substantially the same as the electric circuit 20 according to the first exemplary embodiment. It should be noted that the CPU board 25 according to the second exemplary embodiment is vertically set. A length of the differential pressure sensor 101 in a front-back direction is thus reduced.

Effects of Second Exemplary Embodiment

The differential pressure sensor 101 according to the second exemplary embodiment provides the same effects as those of the differential pressure sensor 1 according to the first exemplary embodiment.

Additionally, since the external terminal 123 is disposed above the open end 122, the entire width of the differential pressure sensor 101 can be reduced. The above configuration is thus suitable when an installation space of the differential pressure sensor 101 is limited in terms of width or when a plurality of differential pressure sensors 101 need to be laterally arranged.

Third Exemplary Embodiment

Figure 9:
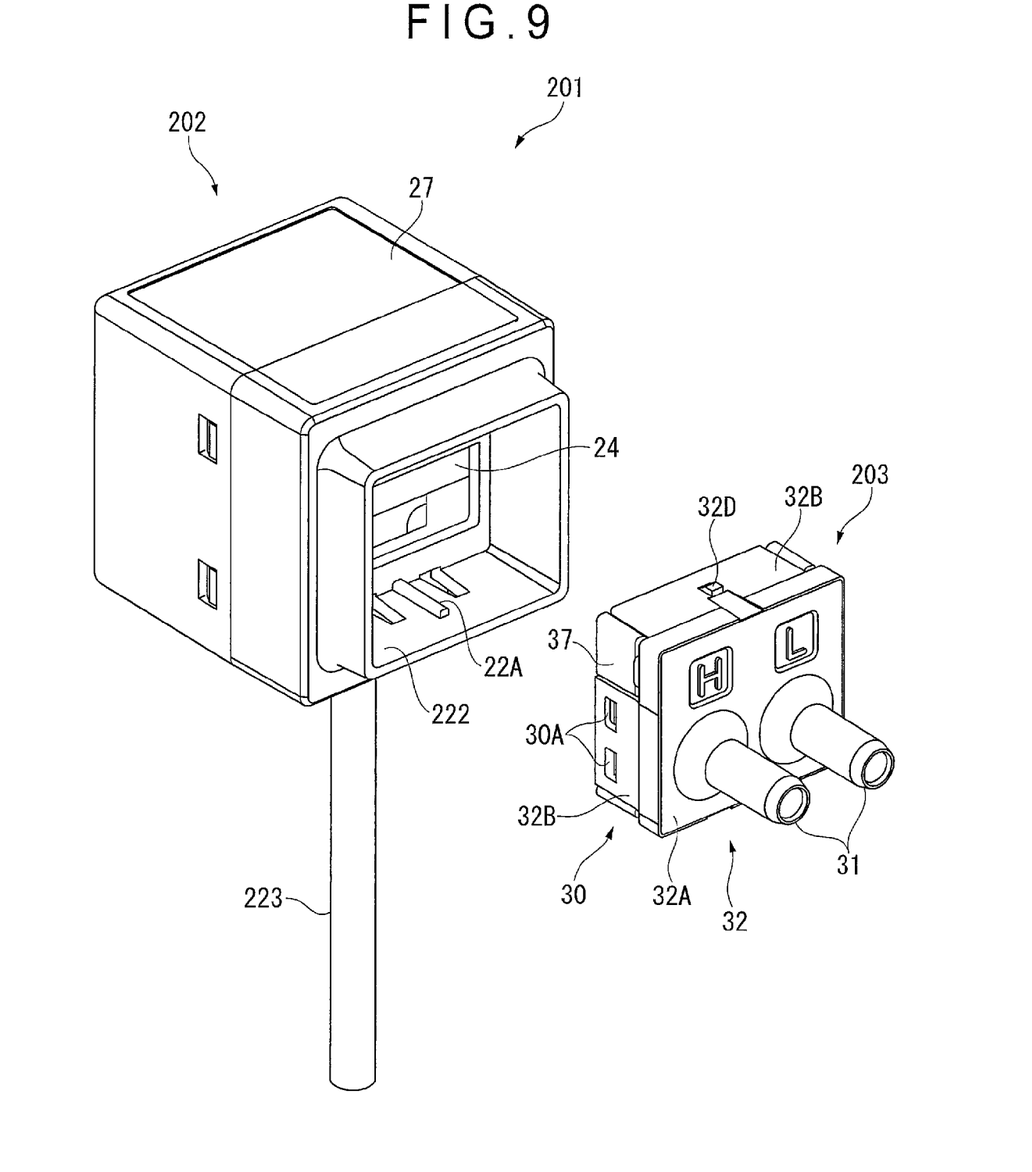
FIG. 9 is a perspective view of a differential pressure sensor according to a third exemplary embodiment of the invention, where a sensor module is before being attached to a case body.
Figure 10:
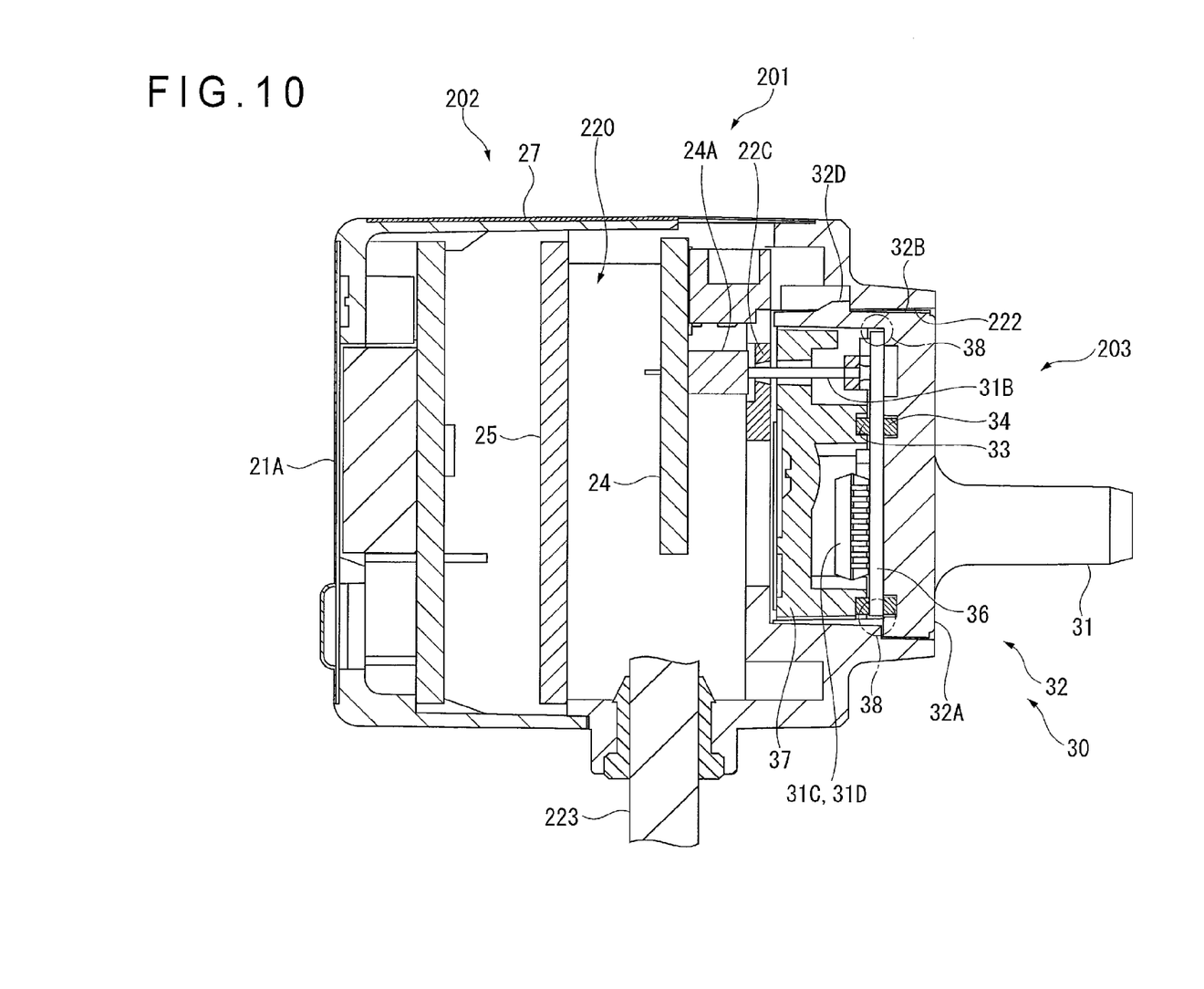
FIG. 10 is a sectional side view of the differential pressure sensor according to the third exemplary embodiment with the sensor module being attached to the case body.

A differential pressure sensor 201 according to the third exemplary embodiment will be described with reference to FIGS. 9 and 10. The differential pressure sensor 201 according to the third exemplary embodiment is different from the differential pressure sensors 1 and 101 according to the first and second exemplary embodiments in the configuration of a case body 202.

The case body 2 according to the first exemplary embodiment includes the external terminal 23, which is in the form of a pair of terminals, disposed at the right side of the open end 22 in a rear view of the differential pressure sensor 1. The case body 2 according to the second exemplary embodiment includes the external terminal 123 disposed above the open end 22. In contrast, the differential pressure sensor 201 according to the third exemplary embodiment is not of a connector-connection type, and thus includes no external terminal. Alternatively, the differential pressure sensor 201 includes a cable 223 drawn downward from a lower side thereof. The differential pressure sensor 201 performs external output with a power supplied thereto through the cable 223.

An open end 222 is structurally substantially the same as the open end 22 according to the first exemplary embodiment. Similarly, an electric circuit 220 is structurally substantially the same as the electric circuit 20 according to the first exemplary embodiment except that the CPU board 25 is vertically set.

Effects of Third Exemplary Embodiment

The differential pressure sensor 201 according to the third exemplary embodiment provides the same effects as those of the differential pressure sensor 1 according to the first exemplary embodiment.

Additionally, since the differential pressure sensor 201 includes no external terminal, the entire height and width thereof can be reduced. The above configuration is thus suitable when a plurality of differential pressure sensors 201 need to be arranged longitudinally and laterally.

Modification(s)

Incidentally, it should be understood that the invention is not limited to the above exemplary embodiments, but may include other elements and/or be modified as follows without departing from the scope of the invention.

For instance, in the exemplary embodiments, the physical quantity measuring device is exemplified by the differential pressure sensor 1, which includes the port 31 in the form of two ports and is configured to measure the differential pressure of a target fluid entering the port 31. However, the physical quantity measuring device may be a two-port differential pressure switch configured to output a contact signal when a differential pressure of a target fluid entering the ports thereof reaches a predetermined value, or a single-port pressure sensor configured to detect a pressure of a target fluid entering the port thereof.

In the exemplary embodiments, the clearance is defined between the right and left inner walls of the open end 22, 122 or 222 and the right and left walls 32B of the sensor module 3. However, such a clearance may be defined not at the right and left sides but at the upper and lower sides.

In the exemplary embodiments, the sensor module 3 is attached at the rear side of the case body 2, 102 or 202, but may be attached at any other side of the case body 2, 102 or 202 (e.g., an upper side).

In the exemplary embodiments, the sheet-shaped filter 35 is disposed between the plate 32A and the sensor substrate 36, but may be disposed at any position upstream of the sensor 31A. For instance, the filter 35 may be in a columnar shape and disposed in the port 31. In this case, the filter 35 can be replaced without the necessity of removing the sensor module 3 from the case body 2, 102 or 202.

What is claimed is:

1. A physical quantity measuring device comprising:
   a sensor module comprising:
      a sensor case comprising a port through which a target fluid is to be introduced and a base attached with the port;
      a sensor configured to detect a physical quantity of the target fluid introduced through the port;
      a sensor substrate attached with the sensor, the sensor substrate having an outer circumferential surface facing an inner circumferential surface of the base; and
      a cover configured to press the sensor substrate against the base; and
   a case body comprising an electric circuit that is housed therein and electrically connectable to the sensor module, the case body having an open end to which the sensor module is externally attached, wherein
   a sensor module clearance is defined between the outer circumferential surface of the sensor substrate and an inner circumferential surface of the sensor case to prevent transfer of a force from the sensor case to the sensor substrate.

2. The physical quantity measuring device according to claim 1, wherein
   the sensor substrate is provided with a connection pin electrically connectable to the electric circuit,
   the electric circuit comprises a terminal connectable to the connection pin, and
   the connection pin extends in a direction where the sensor case is attached to the open end of the case body.

3. The physical quantity measuring device according to claim 2, wherein the case body further comprises a guide member configured to guide the connection pin to the terminal.

4. The physical quantity measuring device according to claim 1, wherein the sensor substrate is provided with a signal converter configured to receive an output signal from the sensor and convert/adjust the output signal.

5. The physical quantity measuring device according to claim 4, wherein
   the sensor module comprises sensor modules with all possible measurement ranges, and
   the signal converter is configured to convert/adjust the output signal from the sensor to a value at which respective outputs from the sensor modules with all possible measurement ranges are to be equalized.

6. The physical quantity measuring device according to claim 4, wherein
   the sensor substrate is provided with a storing circuit configured to store information of the sensor, and
   the electric circuit is configured to share the information with the storing circuit.

7. The physical quantity measuring device according to claim 6, wherein the signal converter and the storing circuit are integral with each other.

8. The physical quantity measuring device according to claim 1, wherein
   the base comprises a plate facing the sensor substrate and a wall disposed around an outer periphery of the plate,
   a projection is provided to one of the wall and the open end, and
   a recess engageable with the projection is provided to the other one of the wall and the open end.

* * * * *